United States Patent [19]

Short et al.

[11] Patent Number: 5,378,386
[45] Date of Patent: Jan. 3, 1995

[54] CLEANING SOLUTIONS FOR REMOVING UNCURED POLYESTER RESIN SYSTEMS FROM THE SURFACES OF PROCESSING EQUIPMENT

[75] Inventors: Sidney M. Short, Fredonia; Jeffrey J. Laven, Sheboygan, both of Wis.

[73] Assignee: Cook Composites and Polymers Co., Port Washington, Wis.

[21] Appl. No.: 106,038

[22] Filed: Aug. 12, 1993

[51] Int. Cl.$^6$ ............... C11D 7/50; C09D 9/00; B08B 7/00
[52] U.S. Cl. ............... 252/162; 252/170; 252/171; 134/38; 134/39; 134/40
[58] Field of Search ............ 252/162, 170, 171; 134/38, 39, 40

[56] References Cited

U.S. PATENT DOCUMENTS

| | | | |
|---|---|---|---|
| 3,954,648 | 5/1976 | Belcak et al. | 252/158 |
| 3,980,587 | 9/1976 | Sullivan | 252/546 |
| 5,064,557 | 11/1991 | Fusiak | 252/162 |
| 5,096,983 | 3/1992 | Gerber | 525/506 |

FOREIGN PATENT DOCUMENTS 0412475  2/1991  European Pat. Off. ............ 252/170

*Primary Examiner*—Paul Lieberman
*Assistant Examiner*—Lorna M. Douyon
*Attorney, Agent, or Firm*—Whyte Hirschboeck Dudek

[57] ABSTRACT

Uncured polyester resins are removed from the surfaces of processing equipment, e.g. mixing and injection heads, by a cleaning solution comprising:

A. At least about 50 weight percent of at least one dibasic acid ester, such as DBE;

B. A sufficient amount of at least one free radical polymerization inhibitor, e.g. hydroquinone, to inhibit the cure of the polyester resin system; and C. A sufficient amount of at least one chelating agent, e.g. tartaric acid, to inhibit the promotional effects of the metal-ion promoter of the free radical polymerization catalyst system.

13 Claims, No Drawings

CLEANING SOLUTIONS FOR REMOVING UNCURED POLYESTER RESIN SYSTEMS FROM THE SURFACES OF PROCESSING EQUIPMENT

BACKGROUND OF THE INVENTION

This invention relates to cleaning solutions. In one aspect, the invention relates to cleaning solutions for removing uncured polyester resin systems from surfaces of processing equipment while in another aspect, this invention relates to cleaning solutions comprising one or more dibasic acid esters, at least one free radical polymerization inhibitor, and at least one chelating agent. In yet another aspect, this invention relates to the use of these cleaning solutions as a cleansing flush for polyester resin processing equipment.

U.S. Pat. No. 5,064,557 to Fusiak teaches a resin cleaner composition for use as a cleaning solvent to remove cured, partially cured and uncured polyester or vinyl ester resins containing a free radical polymerization C initiator from fiberglass fabrication tools. These compositions are characterized by the presence of a free radical inhibitor which suppresses the rate of free radical polymerization, and thus allows the resin to be loaded in increased amounts into the composition without an accompanying increase in the polymerization in the resin, i.e. without the resin gelling. These compositions of Fusiak contain a free radical inhibitor, e.g. hydroquinone, a solvent (e.g. N-methylpyrrolidone), and optionally a diluent, such as a dibasic acid ester (DBE). While these compositions are generally effective for their intended purpose, the amount of resin that can be loaded into the composition is not completely satisfactory.

SUMMARY OF THE INVENTION

According to this invention, uncured polyester resin systems containing a metal-ion promoted, free radical polymerization catalyst system are efficiently removed from the surfaces of dispensing equipment, tools and other such items on which the systems are not desired by a cleaning solution comprising, based on the weight of the solution:

A. At least about 50 percent of at least one dibasic acid ester;
B. A sufficient amount of at least one free radical polymerization inhibitor to
inhibit the cure of the polyester resin system; and
C. A sufficient amount of at least one chelating agent to inhibit the promotional effects of the metal-ion promoter of the free radical polymerization catalyst system.

Preferably, the solution does not contain water and in certain embodiments of this invention, the solution remains a pourable liquid even at a resin loading in excess of 60 weight percent based on the total weight of the cleaning solution and the uncured polyester resin (i.e. the nonvolatiles).

DESCRIPTION OF THE PREFERRED EMBODIMENTS

Any dibasic acid ester or mixture of such esters that will remove an uncured polyester system from the surface of dispensing equipment or other similar items can be used in the practice of this invention. Preferred dibasic acid esters are of the formula $$R_1OOC-R-COOR_1$$

wherein R is an alkylene, e.g. $-(CH_2)_n-$, or inertly-substituted alkylene radical of 1 to about 12 carbon atoms, and each $R_1$ is independently an alkyl or an inertly-substituted alkyl radical of 1 to about 6 carbon atoms.

Preferably R is of 2 to about 6 carbon atoms, and each $R_1$ is 1 or 2 carbon atoms. "Independently" means that each $R_1$ can be the same or different, e.g. each $R_1$ can be a methyl radical or one $R_1$ can be a methyl radical while the other is an ethyl radical. "Inertly-substituted", means that the radical can bear one or more substituents that are essentially nonreactive toward the process reagents and products at the process conditions. Typical inert substituents include alkyl radicals of one or two carbon atoms.

Although the dibasic acid esters can be used either alone or in combination with one or more other dibasic acid esters, mixtures are usually favored for reasons of cost and general availability. The particular components of the mixture and their amounts relative to one another can vary widely. Mixtures commercially known as DBE and comprising at least two of dimethyl glutarate, dimethyl adipate and dimethyl succinate, perform well in this invention and are preferred.

Any material that will inhibit the free radical polymerization of the polyester resin system can be used as the free radical polymerization inhibitor of this invention. Those disclosed in U.S. Pat. No. 5,064,557 to Fusiak, i.e. vanillin, 4-t-butylcatechol, hydroquinone, butylated hydroxytoluene, and the like, are illustrative, and hydroquinone is preferred.

Any material that will chelate the metal ion promoter of the free radical polymerization catalyst system can be used as the chelating agent of this invention. Representative chelating agents include tartaric acid, ethylene diamine tetraacetic acid (EDTA) and its metal salts, nitrilotriacetic acid and its metal salts, diethylene triamine pentaacetic acid, polyphosphates, diketones, hydroxy carboxylic acids and phosphonic acids, and the like.

As noted above, the cleaning solution contains at least about 50 weight percent of at least one dibasic acid ester, and sufficient amounts of at least one free radical polymerization inhibitor and of at least one chelating agent. Preferably, the concentration, based on the weight of the cleaning solution of the dibasic acid ester or dibasic acid ester mixture is at least about 60 weight percent, more preferably at least about 75 weight percent. Preferably, the concentration of the dibasic acid ester or dibasic acid ester mixture does not exceed about 99.8 weight percent.

Preferably, the concentration of the free radical polymerization inhibitor is at least about 0.005 weight percent, more preferably at least about 0.01 weight percent and most preferably at least about 0.02 weight percent. Preferably, the concentration of the free radical polymerization inhibitor does not exceed about 1 weight percent although as a practical matter, amounts in excess of 300 parts per million are not likely to be cost effective.

Preferably the concentration of the chelating agent is at least about 0.1 weight percent, more preferably at least about 0.2 weight percent, and most preferably at least about 0.3 weight percent. Preferably, the concentration of chelating agent in the cleaning solution does not exceed about 0.5 weight percent. The optimum amount will vary with the nature of the chelating agent.

The only limits on the maximum amount of free radical polymerization inhibitor and chelating agent that can be present is their solubility in DBE and in those instances in which solubility is not a factor, then such considerations as convenience and expense.

The cleaning solutions of this invention can contain other ingredients as well, such as other solvents, dyes, fragrances, surfactants, and the like. If these ingredients are present, they are used in conventional amounts.

The cleaning solutions of this invention are used in the same manner as known cleaning solutions. After the uncured polyester resin system is discharged from a piece of dispensing equipment, or after it comes into contact with a surface, typically a metal surface, on which it is not wanted, then the cleaning solution is applied to the dispensing equipment or surface in a manner and in a quantity that removes the resin system into the solution for subsequent removal. In the case of polyester resin dispensing equipment, the uncured resin is typically removed as quickly as possible after the resin has been dispensed from the equipment. In those cases in which an uncured resin system is to be removed from a surface other than an internal surface of a piece of resin mixing or application equipment, the cleaning solution can be applied to the uncured resin system in any conventional manner, e.g. spraying, brushing, dipping, etc., and then removed in any convenient manner, e.g. flushing, wiping, etc. The cleaning solutions can be used at any conditions, but ambient or elevated temperatures, e.g. temperatures above ambient but not in excess of the flash point of the solution, are preferred. Since the polyester resin systems are usually designed for relatively rapid cure, preferably the cleaning solution is applied to the equipment to be cleaned as soon as possible after it has been in contact with the system.

Any of the known polyester resin systems in use today can be removed, in their uncured state, from a metal surface, typically a stainless steel or aluminum surface, by the cleaning solutions of this invention. C These systems typically comprise a polyester prepolymer, a reactive diluent, e.g. styrene, and a metal-ion promoted free-radical polymerization catalyst system. The Stypol® family of engineering thermoset polyester resins manufactured and sold by Cook Composites and Polymers Co. are respresentative. As here used, "uncured" includes systems; that are partially cured, i.e. systems in which the polyester prepolymer and reactive diluent have begun to react. The greater the extent of this reaction, the less efficient the cleaning solution is in removing the resin system from a surface.

The cleaning solutions of this invention can be "loaded" with an uncured polyester resin system in excess of those known solutions based on a dibasic acid ester and a free radical polymerization inhibitor in the absence of a chelating agent. Typically, these known cleaning solutions can be loaded only to about 30 weight percent, based on the weight of the solution, while under like conditions, the solutions of this invention can often be loaded to about 60 weight percent or more, depending upon the composition of the solution. This ability to load the solution to a higher concentration of uncured resin means that less solution is needed to accomplish the same end, and that the solution remains liquid at relatively high loading levels for easy and economical disposal. Moreover, the cleaning solution maintains the very desirable health and environmental safety properties generally associated with DBE-based systems.

The following examples are illustrative of certain specific embodiments of this invention. Unless indicated to the contrary, all parts and percentages are by weight.

EXAMPLE

Tartaric acid (0.35 weight percent), hydroquinone (400 ppm) and fragrance (10 ppm) are added to a mixture of dibasic acid esters (DBE) to form a polyester cleaning solution. After thorough mixing, a polyester resin system comprising a polyester prepolymer, a reactive diluent, and a metal-ion promoted free radical polymerization catalyst system is loaded into the cleaner to form a mixture comprising 60 percent resin C and 40 percent cleaner. After 30 days at ambient conditions, the mixture of resin and cleaning solution does not gel.

In contrast, a mixture of 15 percent of the same polyester resin system and 85 percent of the DBE mixture without the tartaric acid, hydroquinone and fragrance gells within 3 days under like conditions. A mixture of 30 percent of the same polyester system and 70 percent of the DBE mixture containing fragrance and 300 ppm hydroquinone but without the tartaric acid gells in 16 days under like conditions.

Although this invention has been described in considerable detail through the preceding example, this detail is for the purpose of illustration only. Many variations and modifications can be made by one skilled in the art without departing from the spirit and scope of the invention as described in the appended claims.

What is claimed is:

1. A nonaqueous cleaning solution for removing from a surface an uncured polyester resin system comprising a polyester prepolymer, a reactive diluent and a metal-ion promoted free radical polymerization catalyst system, the solution comprising based on the weight of the solution:
   A. At least about 50 percent of at least one dibasic acid ester;
   B. A sufficient amount of at least one free radical polymerization inhibitor to inhibit the cure of the polyester resin system; and
   C. A sufficient amount of at least one chelating agent to inhibit the promotional effects of the metal-ion promotor of the free radical polymerization catalyst system.

2. The cleaning solution of claim 1 in which the dibasic acid ester is of the formula

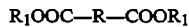

wherein R is an alkylene, or inertly-substituted alkylene radical of 1 to about 12 carbon atoms, and each $R_1$ is independently an alkyl or an inertly-substituted alkyl radical of 1 to about 6 carbon atoms.

3. The cleaning solution of claim 2 in which R is of 2 to about 6 carbon atoms, and each $R_1$ is 1 or 2 carbon atoms.

4. The cleaning solution of claim 1 comprising a mixture of dibasic acid esters.

5. The cleaning solution of claim 2 comprising a mixture of dibasic acid esters at least two of which are selected from the group consisting of dimethyl glutarate, dimethyl adipate and dimethyl succinate.

6. The cleaning solution of claim 5 in which the mixture of dibasic acid esters comprises at least about 75 weight percent.

7. The cleaning solution of claim 6 in which the free radical polymerization inhibitor is selected from the group consisting of vanillin, 4-t-butylcatechol, hydroquinone, and butylated hydroxytoluene.

8. The cleaning solution of claim 7 in which the free radical polymerization inhibitor is present in an amount of at least about 0.005 weight percent.

9. The cleaning solution of claim 8 in which the free radical polymerization inhibitor is hydroquinone.

10. The cleaning solution of claim 8 in which the chelating agent is selected from the group consisting of tartaric acid, ethylenediaminetetraacetic acid and its metal salts, nitrilotriacetic acid and its metal salts, diethylene triamine pentaacetic acid, polyphosphates, diketones, and hydroxy carboxylic acids and phosphonic acids.

11. The cleaning solution of claim 10 which the chelating agent is present in an amount of at least about 0.1 weight percent.

12. The cleaning solution of claim 11 in which the chelating agent is tartaric acid.

13. A nonaqueous cleaning solution for removing from a surface an uncured polyester resin system comprising a polyester prepolymer, a reactive diluent and a metal-ion promoted free radical polymerization catalyst system, the solution consisting essentially of:

A. At least about 50 percent by weight of at least one dibasic acid ester;
  B. A sufficient amount of at least one free radical polymerization inhibitor to inhibit the cure of the polyester resin system; and
  C. A sufficient amount of at least one chelating agent to inhibit the promotional effects of the metal-ion promotor of the free radical polymerization catalyst system.

* * * * *